United States Patent
Bjoernskov et al.

(10) Patent No.: US 9,260,875 B2
(45) Date of Patent: Feb. 16, 2016

(54) SUPPORT ARRANGEMENT OF A WIND TURBINE TOWER

(71) Applicant: SIEMENS AKTIENGESELLSCHAFT, München (DE)

(72) Inventors: Soeren Linde Bjoernskov, Skive (DK); Henning Poulsen, Skjern (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/615,760

(22) Filed: Feb. 6, 2015

(65) Prior Publication Data
US 2015/0308134 A1    Oct. 29, 2015

(30) Foreign Application Priority Data

Apr. 25, 2014 (EP) .................................... 14166018

(51) Int. Cl.
| | |
|---|---|
| *B25B 27/14* | (2006.01) |
| *E04G 25/00* | (2006.01) |
| *B66C 1/10* | (2006.01) |
| *F03D 11/00* | (2006.01) |
| *E04H 12/00* | (2006.01) |
| *F03D 1/00* | (2006.01) |

(Continued)

(52) U.S. Cl.
CPC .............. *E04G 25/00* (2013.01); *B66C 1/108* (2013.01); *E04B 1/92* (2013.01); *E04H 12/00* (2013.01); *E04H 12/24* (2013.01); *F03D 1/005* (2013.01); *F03D 11/00* (2013.01)

(58) Field of Classification Search
USPC ....................................................... 29/281.1
See application file for complete search history.

(56) References Cited

U.S. PATENT DOCUMENTS

| | | | |
|---|---|---|---|
| 2004/0091346 A1 | 5/2004 | Wobben | |
| 2009/0304475 A1* | 12/2009 | Wessel | B63B 35/003 410/44 |
| 2011/0194896 A1 | 8/2011 | Fenger | |

FOREIGN PATENT DOCUMENTS

| | | |
|---|---|---|
| CN | 201771687 U | 3/2011 |
| DE | 112010005504 T5 | 3/2013 |

(Continued)

OTHER PUBLICATIONS

Extended European Search Report for European Application No. 14166018.3, dated Oct. 20, 2014.

*Primary Examiner* — Lee D Wilson
*Assistant Examiner* — Alvin Grant
(74) *Attorney, Agent, or Firm* — Schmeiser Olsen & Watts LLP (57) ABSTRACT

A support arrangement of a wind turbine tower and a method to support the tower is provided. A support arrangement for a wind turbine tower is disclosed, whereby the support arrangement includes a first connection means to connect to a first part of the tower. The support arrangement includes a second connection means to connect to a second part of the tower. The first connection means are fixed in their position in respect to the support arrangement, and the second connection means are adjustable connected to the support arrangement, so that the distance between the first connection means and the second connection means is adjustable to counteract a deformation of the tower due to gravity. The support arrangement includes a third connection means to detachably fix the position of the second connection means in respect to the support arrangement 1 to support the counteracted shape of the tower.

18 Claims, 7 Drawing Sheets

(51) Int. Cl.
    *E04B 1/92*    (2006.01)
    *E04H 12/24*   (2006.01)

(56) References Cited

FOREIGN PATENT DOCUMENTS

| DE | EP 2620389 A1 * | 7/2013 | ............ F03D 1/005 |
| DE | 102012002755 A1 * | 8/2013 | ............ F03D 1/005 |
| DK | EP 2418376 A1 * | 2/2012 | ............ B60P 3/40 |
| EP | 2345810 A1 | 7/2011 | |
| EP | 2360372 A1 | 8/2011 | |
| EP | 2617990 A1 | 7/2013 | |
| EP | 2824057 A1 | 1/2015 | |
| JP | 2002059776 A | 2/2002 | |
| WO | WO 2013117182 A1 | 8/2013 | |

\* cited by examiner

SUPPORT ARRANGEMENT OF A WIND TURBINE TOWER

CROSS-REFERENCE TO RELATED APPLICATIONS

This application claims priority to European Application No. 14166018, having a filing date of Apr. 25, 2014, the entire contents of which are hereby incorporated by reference.

FIELD OF TECHNOLOGY

The following relates to a support arrangement of a wind turbine tower and a method to support the tower.

BACKGROUND

A wind turbine comprises a rotor, a nacelle and a tower. The rotor is rotatable connected to the nacelle and the nacelle is connected rotatable to the tower.

Parts of the wind turbine are prefabricated and are then transported to the installation site of the wind turbine. At the installation site the prefabricated parts of the wind turbine are connected to build a wind turbine.

The tower of the wind turbine is prefabricated in segments. The segments are transported to the installation site and are there connected to form the tower of the wind turbine.

Nowadays, wind turbine towers are more than 60 m high, often more than 90 m. They have a circular crosscut and have a diameter of more than three meters, and are made of steel. For transportation and installation a tower is segmented into several segments. The segments comprise means for connection at their ends, for example, flanges, to connect the tower segments to each other during installation.

The wind turbine tower segments are stored and transported in a horizontal orientation, thus in a lying manner.

Due to gravity, the horizontally oriented tower segments tend to deform in a way that the circular crosscut ovalizes. It is therefore known to support the tower segment at the flanges in a vertical direction to avoid the deformation.

WO 2013/117182 A1 describes a method for handling tower sections for a tower, in particular a wind power plant, wherein the finished tower sections are at least stored, transported and sequentially set up at least partially one on top of another. The tower sections are each already equipped on their ends with a handling device during or after their completion. Then the finished tower sections are coupled to the load-bearing equipment of transport means using the handling device with unchanged linkage thereof on the tower section and then the tower sections are brought in the horizontal position to the location of their erection. The tower sections transported to the erection location are then brought to a vertical position by means of the handling device with unchanged linkage thereof on the tower section by means of at least one lifting device.

This shows the disadvantage that the tower segment is attached to the frame in the shape it already acquired. A tower segment in a horizontal orientation deforms in an elastic deformation as soon as it reaches this orientation. The tower segment is then connected to the transportation frame. Thus, the tower segment is stored and transported in a slightly elastically deformed shape.

This leads to problems during transportation. The tower segment in its slightly elastically deformed shape is connected to a rigid transportation frame. Due to changing forces during transportation, the tower segment varies its elastic deformation, whereby the connection means between the tower segment and the transportation frame might be damaged.

Embodiments of the invention provide a transportation frame that preserves the tower segment in its original shape.

SUMMARY

A support arrangement for a wind turbine tower is disclosed. The support arrangement comprises a first connection means to connect to a first part of the tower. The support arrangement comprises a second connection means to connect to a second part of the tower.

The first connection means are fixed in their position in respect to the support arrangement. The second connection means are adjustable connected to the support arrangement, so that the distance between the first connection means and the second connection means is adjustable to counteract a deformation of the tower due to gravity.

The support arrangement comprises a third connection means to detachably fix the position of the second connection means in respect to the support arrangement to support the counter acted shape of the tower.

The tower of a nowadays wind turbine has a diameter of several meters and is over 80 meters in heights. To transport the tower from a manufacturing site to the installation site of the wind turbine, the tower is transported in segments. During storage and transportation, the segments of the tower are oriented mainly horizontally with their longitudinal axis.

Wind turbines often comprise metal towers. Thus, the segments of the tower are made of hollow, cylindrical, metal pieces. Due to gravity, the segments of the wind turbine tower tend to deform during storage and transportation.

The support arrangement is disclosed to be connected to a wind turbine tower segment. The support arrangement comprises a first connection means. The first connection means is connected to a first part of the tower.

Preferably, the first connection means is connected to the flange of the wind turbine tower. The first connection means is fixed in its position to the support arrangement.

The support arrangement comprises a second connection means that is connected to a second part of the wind turbine tower.

Preferably, the second connection means is connected to the flange of the wind turbine tower. The second connection means are adjustable connected to the support arrangement. Thus, the distance between the first connection means and the second connection means is adjustable.

The first connection means and the second connection means are connected to the wind turbine tower. Preferably, the first connection means are connected to the upper end of a flange of a wind turbine tower segment. The second connection means are connected to the lower part of a flange of a wind turbine tower segment of a horizontally oriented wind turbine tower.

The distance between the first connection means and the second connection means can be adjusted. Thus, the distance of the upper part of the flange of the wind turbine tower and the lower part of the flange of the wind turbine tower can be adjusted.

Thus, a certain predetermined distance between the first and the second connection means can be achieved. Thus, a certain predefined shape of the tower can be achieved. Thus, deformation of the tower due to gravity can be counteracted.

The support arrangement comprises a third connection means to detachedly fix the position of the second connection means in respect to the support arrangement. Thus, the achieved shape of the tower segment can be fixed.

The third connection means comprise screws or bolts, for example, to fix the second connection means in respect to the support arrangement.

A certain deformation that already occurred during storage of the wind turbine tower segment is eliminated by adjusting the second connection means.

The predetermined shape of the wind turbine tower segment can be fixed by fixing the second connection means to the support arrangement. Thus, a further deformation of the tower can be avoided during storage and transportation of the wind turbine tower segment.

Preferably, the support arrangement is connected to the tower at the production site of the tower after the production. The support arrangement stays connected to the tower until the tower is set up at the installation site of the wind turbine.

Thus, the support arrangement avoids a further deformation of the tower during the transportation and storage from the production site of the tower to the installation site of the wind turbine.

A support arrangement comprises a linear actuator to adjust the position of the second connection means in respect to the support arrangement.

The linear actuator is used to increase or decrease the linear distance between the first connection means and the second connection means. Thus, the distance between the first connection means and the second connection means can be adjusted by using a linear actuator.

The linear actuator can be used to adjust the distance between the first connection means and the second connection means until the second connection means are fixed to the support arrangement.

Thus, the distance between the first connection means and the second connection means is fixed by the support arrangement and a linear actuator can be removed from the support arrangement.

The linear actuator may comprise a bolt and a nut, or a worm gear that is actuated by an electric motor, or a mechanical arrangement with a gear, for example.

The linear actuator is a hydraulic cylinder.

A hydraulic cylinder can be designed to be strong enough to adjust the distance between the first and the second connection means.

A smooth adjustment can be performed by using hydraulic pressure.

Thus, the distance between the first connection means and the second connection means can be adjusted with less human effort.

The support arrangement comprises a frame to connect the first and the second connection means wherein the frame comprises at least two vertical and two horizontal beams.

The support arrangement comprises a frame. The first connection means are connected to the frame and the second connection means are adjustable connected to the frame.

After the second connection means are fixed in their position in respect to the support arrangement, the support arrangement supports the distance between the first connection means and the second connection means.

Thus the frame supports the distance between the first and the second connection means, and thus supports the desired shape of the wind turbine tower segment.

The frame of the support arrangement comprises at least two vertical beams that are connected by at least two horizontal beams.

Thus, the frame of the support arrangement is ridged enough to support the distance between the first and the second connection means.

In addition, the frame of the support arrangement is ridged enough to serve as a tool for transportation and storage of the wind turbine tower segment.

The first and/or the second connection means comprise a pad that is attachable to a flange of the tower.

The pads are detachably connected to the first and/or the second connection means.

Thus, the pads can be connected to the flange of the wind turbine tower and thereafter the pads can be connected to the first connection means or the second connection means.

Thus, the pads can be connected to the wind turbine tower segment independently from the support arrangement. Thus, the connection between the support arrangement and the wind turbine tower segment can be performed easier.

The pad is attached to the support arrangement by a pin.

A locking pin is used to attach a pad to the first and/or the second connection means.

Thus, the pads can be connected to the connection means in a quick and easy manner.

The second connection means comprise an adjustable locking pin system to connect to the support arrangement and the locking pin system interacts with a through-hole in the support arrangement.

The support arrangement comprises a through-hole. To connect the second connection means to the support arrangement, the locking pin is pushed through the through-hole.

The through-hole shows a longish shape. Thus, the locking pin can move along within the longish shape of the through-hole.

Thus, the connection between the second connection means and the support arrangement can be established by arranging the locking pin through the through-hole.

In addition, the position of the second connection means can be adjusted after establishing the connection between the second connection means and the support arrangement.

The position of the second connection means in respect to the support arrangement can be adjusted by sliding the locking pin up and down in the longish shape of the through-hole.

Thus, an adjustment of the position of the second connection means at the support arrangement is possible after establishing the connection between the second connection means in the support arrangement.

A linear actuator is attachable to the locking pin system to adjust the position of the locking pin system in respect to the through-hole in the support arrangement.

The connection between the second connection means in the support arrangement is established by attaching the locking pin through the through-hole of the support arrangement. The position of the second connection means in respect to the support arrangement is adjusted by moving the locking pin up and down in the longish shape of the through-hole.

After the adjustment of the locking pin a certain slack is present in the system. This means that the locking pin is still able to move within the through-hole.

A linear actuator is attached to the locking pin system to adjust the position of the locking pin system in respect to the through-hole to eliminate the slack from the system.

After eliminating the slack from the system, the locking pin is no longer able to move and change its position within the through-hole of the support arrangement.

The first connection means comprise an adjustable locking pin system to connect to the support arrangement and the locking pin system interacts with the through-hole in the support arrangement.

The first connection means is connectable to the support arrangement. The support arrangement comprises a through-going hole to be used by a locking pin. To connect the first connection means to the support arrangement, the locking pin is pushed through the through-hole in the support arrangement.

Thus, the connection between the first connection means and the support arrangement can be established quickly and easily.

The first and/or the second connection means comprise adapter plates as brackets to support a connection of the pads to the support arrangement.

To connect the first and/or the second connection means to the support arrangement, the connection is established by pushing the locking pin through the through-hole of the support arrangement.

The diameter of the locking pin is smaller than the size of the through-hole in the support arrangement. Thus, the locking pin can still move within the through-hole.

Adapter plates are used as brackets to support the connection of the locking pin within the through-hole of the support arrangement.

The adapter plates are used to push the locking pin into a certain direction to eliminate the slack of the locking pin within the through-hole.

The adapter plates at the first connection means are pushed upwards to force the locking pin into a position where it is fixed in respect to the support arrangement.

The adapter plates at the second connection means are used to push the locking pin downward into a position where it is fixed in respect to the support arrangement.

The adapter plates are used to fix the position of the second connection means in respect to the support arrangement. The third connection means comprise the adapter plate of the second connection means.

Thus the adapter plates are used as the third connection means of the support arrangement, to fix the position of the second connection means in respect to the support arrangement.

The locking in system comprises the locking pin and the adapter plate that is used to fix the position of the locking pin.

Thus, the connection between the first connection means and the support arrangement, or the second connection means and the support arrangement, can be established quite quickly by introducing the locking pin into the through-hole. The position of the locking pin within the through hole can be fixed by using the adapter plate.

The adapter plate at the second connection means comprise adjustment screws so that the position of the adapter plate is adjustable in respect to the support arrangement by the use of the adjustment screws.

To get the slack out of the system and to fix the position of the locking pin in respect to the support arrangement the adapter plate at the second connection means can be adjusted.

To adjust the position of the adapter plate at the second connection means, the adapter plate comprises adjustment screws. The adjustment screws are arranged in a way to allow an adjustment of the adapter plate in respect to the support arrangement in three orthogonal directions.

Thus, the position of the adapter plate in respect to the support arrangement can be adjusted in three directions in space.

The support arrangement comprises connection means to connect a crane or a load restraint assembly for handling storage or transportation.

The support arrangement is connected to the wind turbine tower segment during storage handling and transportation of the tower segment.

The support arrangement is equipped with connection means to connect a crane or a load restraint assembly to the support arrangement.

Thus, the support arrangement can be used to handle the tower segment by connecting the hook of a crane to the support arrangement.

In addition, the support arrangement can be fixed in its position to a transportation device by adding a load restraint assembly that is connected to connection means at the support arrangement.

A method is disclosed to support the tower of a wind turbine, whereby a support arrangement comprises a first connection means to connect to a first part of the tower and the support arrangement comprises a second connection means to connect to a second part of the tower. The first connection means are fixed in their position in respect to the support arrangement and a second connection means are adjustable connected to the support arrangement, so that the distance between the first connection means and the second connection means is adjustable to counteract deformation of the tower due to gravity.

The support arrangement comprises third connection means to detachably fix the position of the second connection means in respect to the support arrangement to support the counteracted shape of the tower. The method comprises the steps of connecting the first connection means to the tower, connecting the second connection means to the tower, adjusting the position of the second connection means in respect to the support arrangement, and fixing the position of the second connection means in respect to the support arrangement.

A method is disclosed that comprises the additional steps of attaching a linear actuator to the second connection means, using the linear actuator to adjust the position of the second connection means in respect to the support arrangement, fixing the position of the second connection means in respect to the support arrangement, and detaching the linear actuator.

A method is disclosed whereby the second connection means comprise a locking pin system. The method comprises the additional steps of attaching a second linear actuator to the locking pin system, adjusting the position of the locking pin system with the second linear actuator, and fixing the position of the second connection means in respect to the support arrangement.

BRIEF DESCRIPTION

Some of the embodiments will be described in detail, with reference to the following figures, wherein like designations denote like members, wherein.

DETAILED DESCRIPTION

Figure 1:
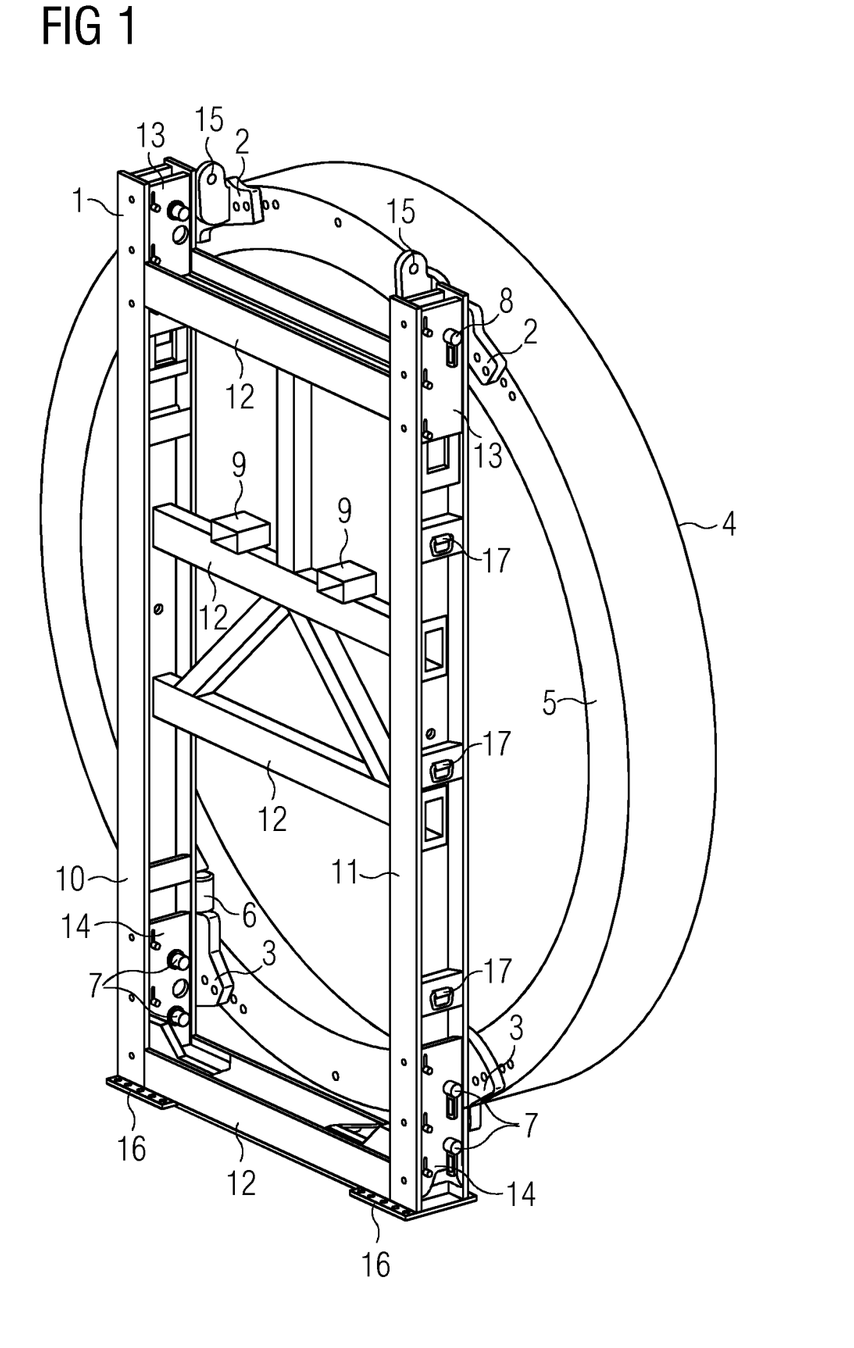
FIG. 1 shows an embodiment of a support arrangement for a wind turbine tower.

FIG. 1 shows a support arrangement for a wind turbine tower.

FIG. 1 shows a support arrangement 1 for a wind turbine tower 4. The support arrangement 1 comprises first connection means 2 that are connected to a first part of the wind turbine tower 4 and second connection means 3 that are connected to a second part of the wind turbine tower 4.

The wind turbine tower 4 in FIG. 1 comprises a flange 5. The first connection means 2 and a second connection means 3 are connected to the flange 5 of the tower 4.

The support arrangement 1 shows the form of a frame. The frame of the support arrangement shows vertical beams 10 and 11 and horizontal beams 12 that connect the vertical beams 10 and 11.

The frame of the support arrangement 1 comprises attachment points for a crane 15 and also attachment points for a forklift 9.

In addition, the support arrangement 1 is equipped with foot plates 16 for storage of the frame.

The vertical bars 10 and 11 of support arrangement 1 show eyes 17 for a load restraint assembly. Thus, the support arrangement 1 can be used for transportation handling and storage of a wind turbine tower 4.

The connection means 2 and 3 comprises plates that are connected to the flange 5 of the wind turbine tower 4. The plates of the connection means 2 and 3 are then connected to the frame of the support arrangement 1.

The first connection means 2 comprises an adapter plate 13 that connects the connection means 2 to the support arrangement 1 by a locking pin arrangement.

An adjustable locking pin 8 at an upper end of the frame connects the pads of the first connection means 2 to the support arrangement 1. An adapter plate 13 is used to fix the locking pin 8 in its position in respect to the support arrangement 1.

The second connection means 3 comprises an adapter plate 14 to fix the position of the locking pin 7 in respect to the support arrangement 1. The adjustable locking pin 7 connects the pad of the second connection means 3 to the support arrangement 1.

The adapter plate 14 comprises adjustment screws to adjust the position of the adapter plate in respect to the support arrangement 1. The adjustment screws can be arranged in a way to adjust the position of the adapter plate in three orthogonal directions.

The adjustable locking pins 7 and 8 interact with a through-going hole in the frame of the support arrangement 1.

The pads of the first connection means 2 are connected to the flange 5 of the tower 4. The pads of the second connection means 3 are connected to the flange 5 of the tower 4.

The second connection means 3 are adjustable in their position in respect to the support arrangement 1.

A linear actuator 6 preferably a hydraulic cylinder is arranged between the second connection means 3 and the support arrangement 1. The position of the second connection means 3 at the support arrangement 1 is adjusted by activating the linear actuator 6.

The upper end of the flange of the horizontally arranged tower 4 is fixedly connected to the support arrangement 1. The lower end of the flange 5 of the tower 4 is adjusted in its position in respect to the support arrangement 1 by the linear actuator 6.

After the adjustment of the position of the lower part of the flange 5 in respect to the support arrangement 1, the second connection means 1 are detachable but fixed connected to the support arrangement 1.

Segments of a tower, like the tower 4 in FIG. 1, tend to deform due to gravitation during transportation and storage. Thus, the circular shape of the crosscut of the tower tends to ovalize.

The adjustment of the second connection means 3 in respect to the support arrangement 1 counteracts the deformation of the tower 4 and prevents a further ovalization of the crosscut of the tower.

Before the second connection means 3 is fixed in its position in respect to the support arrangement 1 a second linear actuator is introduced between the support arrangement 1 and the adjustable locking pin system of the second connection means 3.

Thus, the adjustable locking pin 7 of the second connection means 3 are brought into a final position before fixing the position of the second connection means 3 in respect to the support arrangement 1.

The linear actuator 6 and/or the second linear actuator can be removed after the position of the second connection means 3 is fixed in relation to the support arrangement 1.

Figure 2:
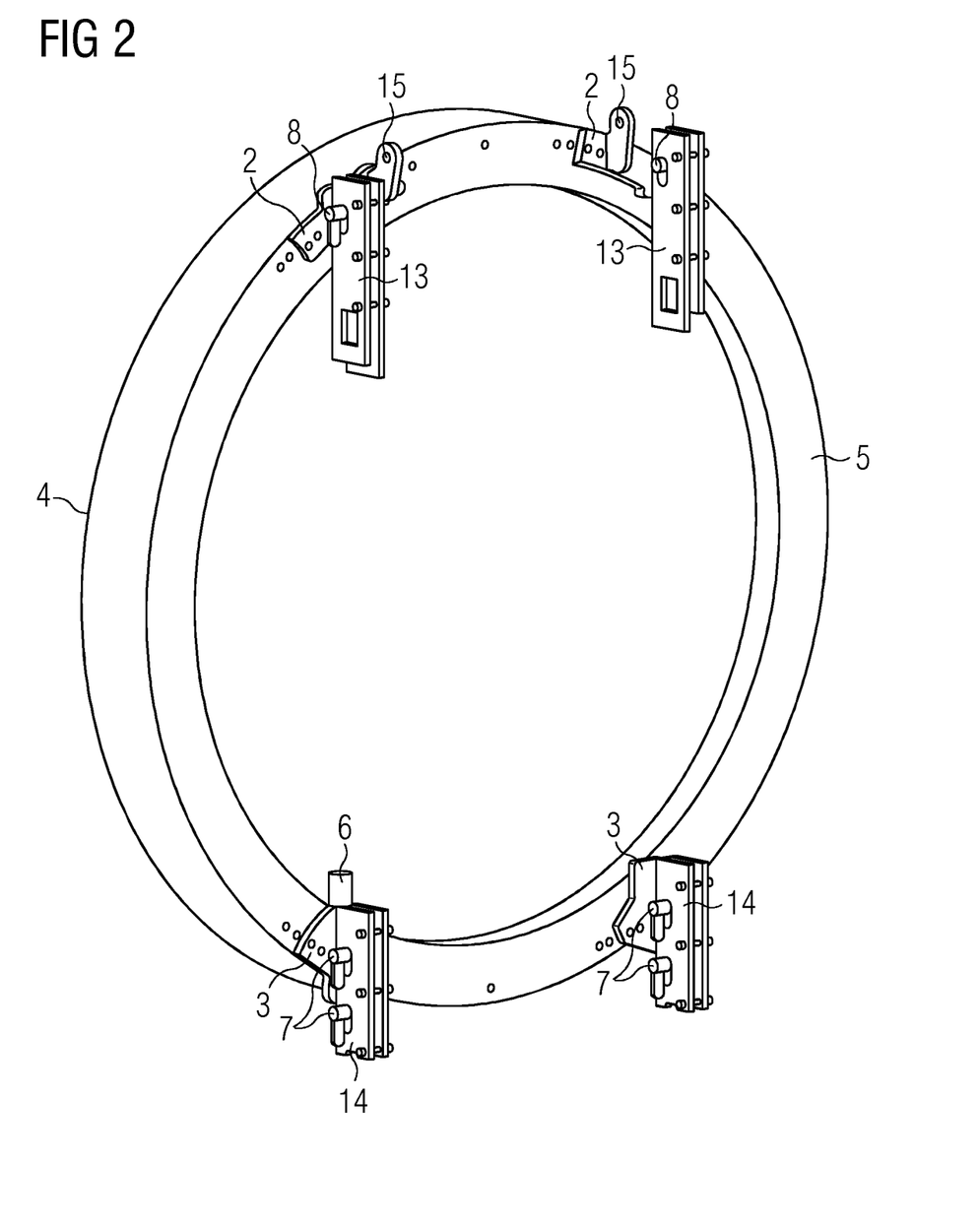
FIG. 2 shows an embodiment of the connection means at a flange of a tower.

FIG. 2 shows the connection means at a flange of a tower.

FIG. 2 shows a tower 4 with a flange 5. The connection means 2 and 3 are connected to the flange 5 of the tower 4. The first connection means 2 are connected at an upper end of the tower flange 5 and the second connection means 3 are connected to the lower part of the flange 5 of the tower 4.

The first connection means 2 comprise pads that are connected to the flange of the tower. The first connection means comprise adapter plates 13 and an adjustable locking pin 8 that are used to connect the first connection means 2 to the support arrangement 1.

In addition, the first connection means 2 comprise connection means for a crane 15. Thus, the first connection means 2 and also the support arrangement 1 can be used to transport and handle the tower 4 by crane.

The second connection means 3 are connected to the lower part of the tower flange. The second connection means 3 comprise pads that are connected to the flange 5 of the tower 4.

In addition, the second connection means 3 comprise adapter plates 14 and an adjustable locking pin 7 to connect the second connection means 3 to the support arrangement 1.

The linear actuator 6 is shown in FIG. 2. The linear actuator 6 preferably a hydraulic cylinder is used to adjust the position of the second connection means 3 in respect to the first connection means 2.

Thus, an ovalization of the tower 4 can be eliminated by adjusting the position of the second connection means 3 in respect to the first connection means 2.

Figure 3:
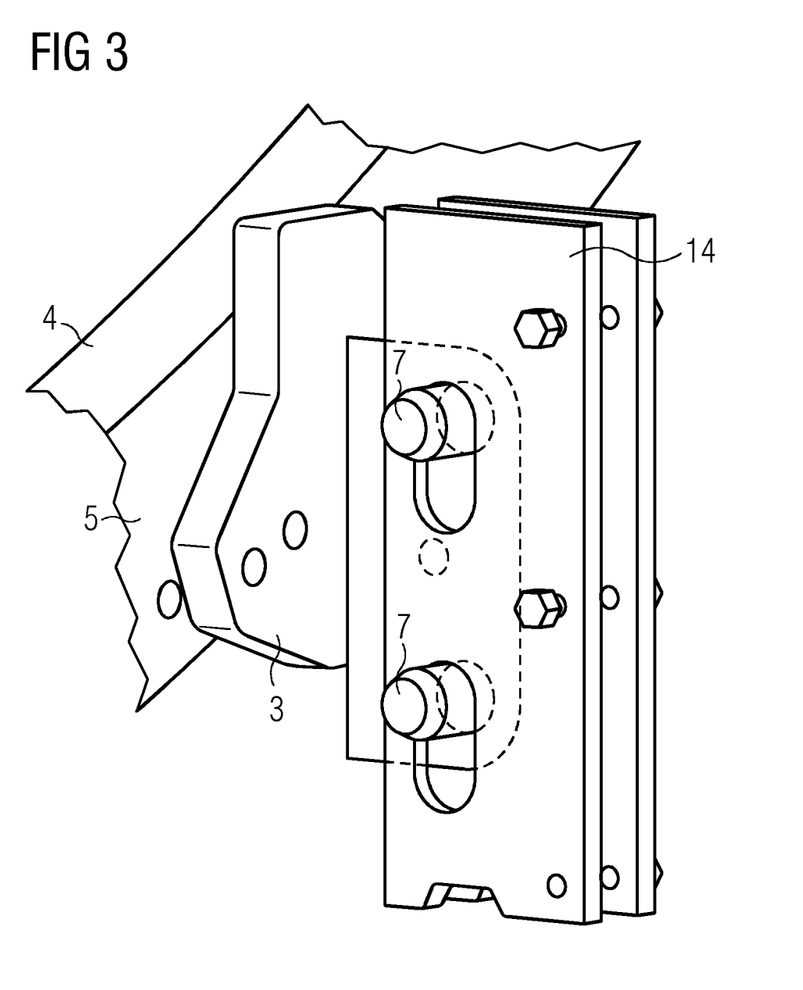
FIG. 3 shows a detailed view of an embodiment of the second connection means.

FIG. 3 shows a detail of the second connection means.

FIG. 3 shows a detail of the second connection means 3. The second connection means 3 comprise a pad that is connected to the flange 5 of the tower 4. The second connection means 3 in addition comprises an adapter plate 14 and an adjustable locking pin 7.

The support arrangement 1 comprises through-going holes that are used by the adjustable locking pin 7. The adjustable locking pin 7 is used to connect the second connection means 3 to the support arrangement 1. The adapter plate 14 is used to fix the locking pin 7 in its position after adjusting the locking pin within the hole in the support arrangement 1.

The position of the adjustable locking pin 7 can be adjusted in the longish holes of the support arrangement 1 to adjust the position of the second connection means 3 in respect to the support arrangement 1, or the first connection means 2.

Figure 4:
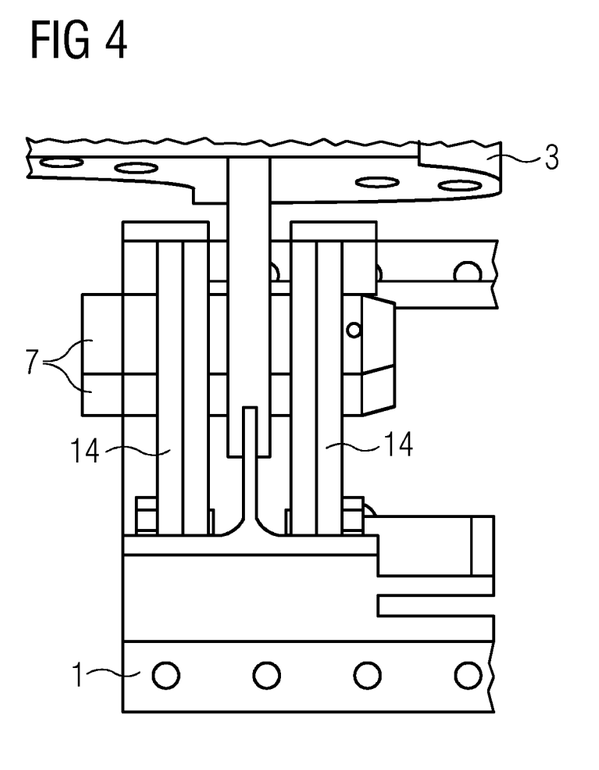
FIG. 4 shows a second view of an embodiment of the second connection means.

FIG. 4 shows a second view of the second connection means.

FIG. 4 shows a second view of the second connection means 3. The second connection means 3 are connected to the flange 5 of the tower 4. The second connection means 3 are connected to the support arrangement 1 by an adapter plate 14 and an adjustable locking pin 7. The support arrangement 1 shows a longish through-going hole that is used by the adjustable locking pin 7.

Figure 5:
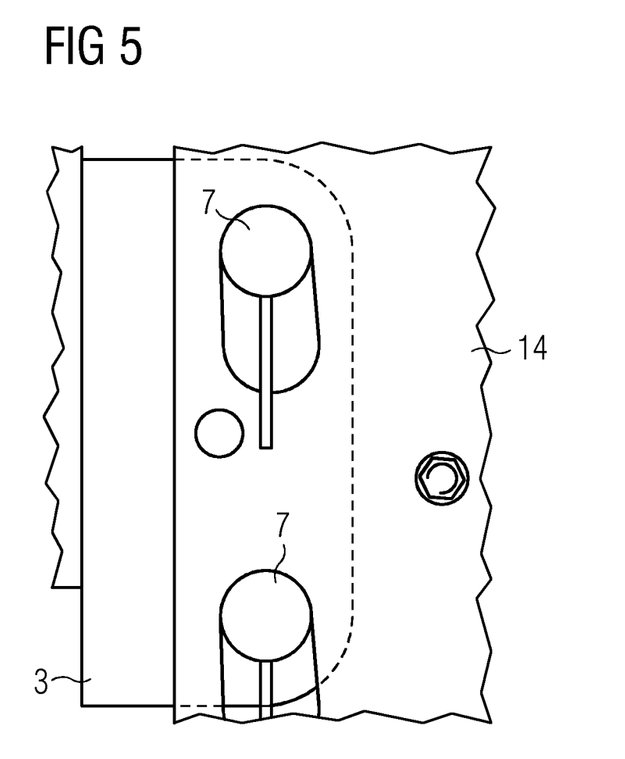
FIG. 5 shows a detailed view of an embodiment of the connection means.

FIG. 5 shows a detail of the connection means.

FIG. 5 shows a detail of the second connection means 3.

The second connection means 3 are connected to the support arrangement 1 by adjustable locking pins 7. The adjustable locking pins 7 are arranged in a longish hole in the adapter plate 14.

The second connection means 3 are adjustable in their position in respect to the support arrangement 1. The second connection means 3 comprise an adapter plate 14 to fix the adjusted position of the locking pin 7 in respect to the support arrangement 1, and thus to fix the position of the second connection means 3 in respect to the support arrangement 1.

The position of the locking pin 7 is adjusted by sliding the adapter plate 14 down. The adapter plate 14 pushes the locking pin 7 downward within the longish hole in the support arrangement 1. Thus any air or slag can be removed from the connection between the second connection means 3 and the support arrangement 1.

In FIG. 5 the adapter plate 14 is in its locking position, to lock the position of the locking pin 7.

Figure 6:
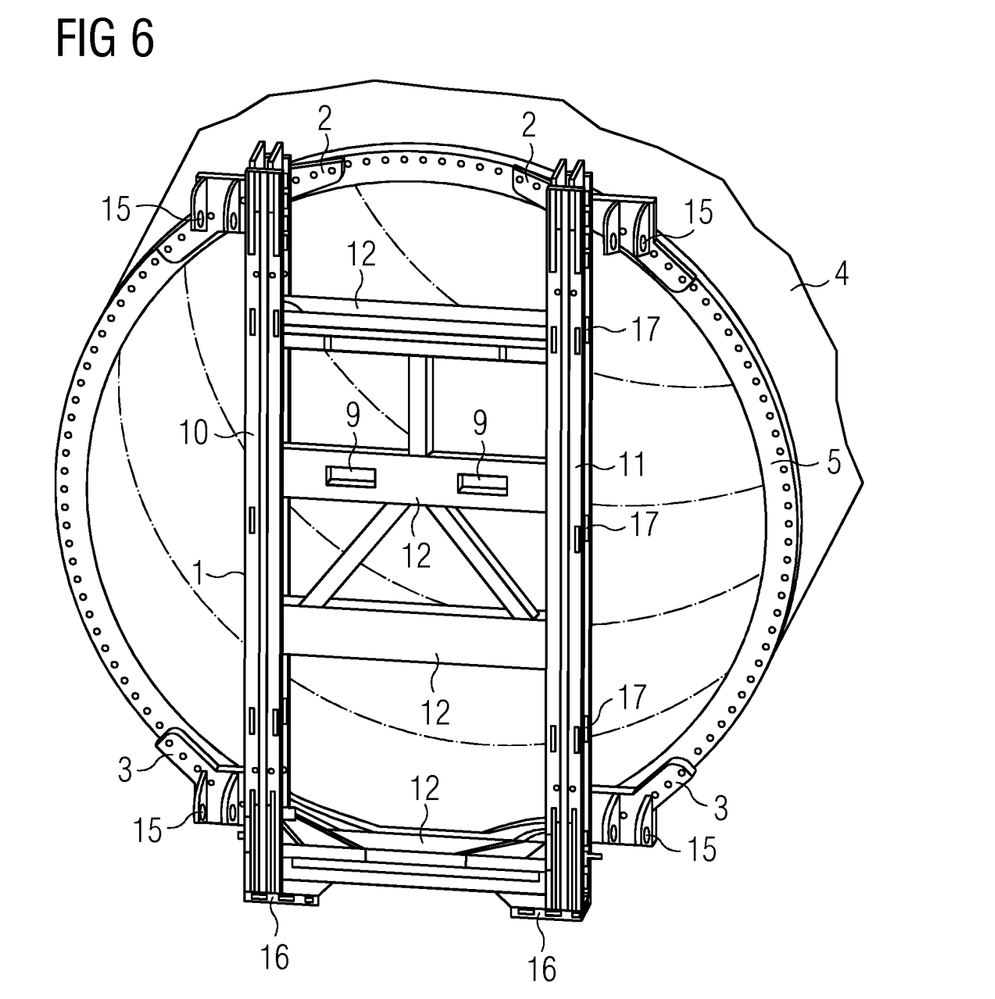
FIG. 6 shows a second embodiment of the support arrangement.

FIG. 6 shows a second embodiment of the support arrangement.

FIG. 6 shows a second embodiment of the support arrangement 1. The support arrangement 1 is a frame-like structure comprising vertical beams 10 and 11 and horizontal beams 12.

The support arrangement 1 comprises first connection means 2 that are connected to an upper part of a flange 5. The flange 5 is the flange of the tower 4.

The support arrangement 1 is connected to the flange 5 of the tower 4 to support the shape of the tower and to allow transportation storage and handling of the tower segment 4.

The support arrangement 1 comprises a second connection means 3 that are connected to a lower part of the tower flange.

The first connection means 2 are fixed in their position in respect to the support arrangement 1.

The second connection means 3 are adjustable in their position in respect to the support arrangement 1. The tower is connected to the first connection means 2 that are connected to the support arrangement 1.

The tower is then connected to the second connection means 3 and the second connection means 3 are adjusted in their position in respect to the support arrangement 1.

Thus, a deformation of the tower can be compensated. As soon as the tower is in the desired shape, the second connection means 3 are connected to the support arrangement 1 by third connection means, like an adjustable locking pin system, and are fixed in their position.

For the adjustment of the second connection means 3 in respect to the support arrangement 1, a linear actuator 6 is arranged at a support arrangement 1.

Connection means 15 to connect a hook of a crane are arranged at the first connection means 2 and at the second connection means 3. Thus, the support arrangement 1 can be used to lift the tower segment 4 from a horizontal into a vertical position.

The frame-like structure of the support arrangement 1 shows attachment points 9 for a forklift. In addition, the support arrangement 1 shows foot plates 16 for storage.

In addition, the support arrangement 1 shows eyes 17 for a load restraint assembly. Thus the support arrangement 1 can be fixed to a transport vehicle during transportation of the tower 4.

Figure 7:
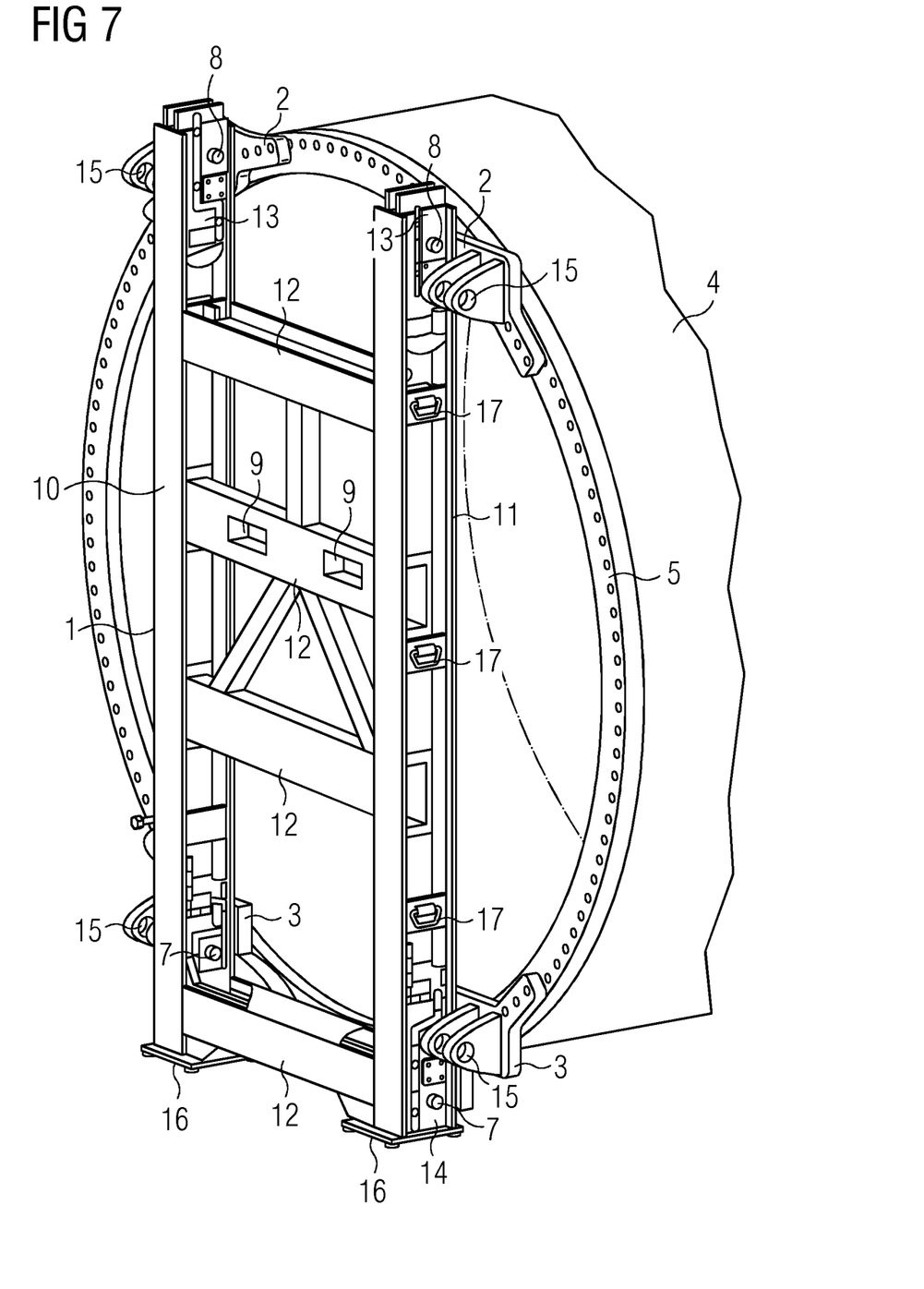
FIG. 7 shows a third embodiment of the support arrangement.

FIG. 7 shows a third embodiment of the support arrangement.

FIG. 7 shows a third embodiment of the support arrangement 1. The support arrangement 1 is used to support a segment of a tower 4. The tower 4 comprises a flange 5 at its end.

The support arrangement 1 is connected to the flange 5 of the tower 4. The support arrangement 1 shows a first connection means 2 and a second connection means 3. The first and second connection means are connected to the flange 5 of the tower by bolts.

The first connection means 2 are detachably attached to the support arrangement 1, but they are fixed in their position in respect to the support arrangement 1.

The second connection means 3 are detachably attached to the support arrangement 1, but the position of the second connection means 3 in respect to the support arrangement 1 is adjustable. Thus, the distance between the first connection means two and the second connection means 3 is adjustable.

Thus, the shape of the crosscut of the tower is adjustable.

The tower 4 is first connected to the first connection means 2. The tower is then connected to the second connection means 3. The distance between the second connection means 3 and the first connection means 2 is then adjusted.

As soon as the tower shows the desired shape, and the deformation of the tower is compensated, the second connection means 3 are fixed in their position in relation to the support arrangement 1.

Thus, the segment of the tower 4 can be transported, stored and handled without losing the desired shape of the tower 4.

The support arrangement 1 shows a frame-like structure, this can be an H-shaped frame. The support arrangement 1 shows vertical beams 10 and 11 that are connected by horizontal beams 12.

One of the horizontal beams 12 shows attachment points 9 for a forklift. Thus, the support arrangement 1 can be handled by a forklift.

On the lower end, the support arrangement 1 shows foot plates 16 for storage.

Connection means 15 for a crane are present at a first connection means 2 and at a second connection means 3.

The vertical beams 10 and 11 of the support arrangement 1 show eyes 17 to arrange a load restraint assembly. Thus, the support arrangement 1 can be attached to a transportation vehicle by belts during transportation.

The first connection means 2 are connected to support arrangement 1 by an adjustable locking pin system comprising an adjustable locking pin 8 and an adapter plate 13.

The second connection means 3 are connected to the support arrangement 1 by an adjustable locking pin system. The adjustable locking pin system of the second connection means 3 comprises a locking pin 7 and an adapter plate 15.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A support arrangement for a wind turbine tower, comprising:
   a first connection means to connect to a first part of the wind turbine tower; and
   a second connection means that is connected to a second part of the wind turbine tower;
   wherein the first connection means are fixed in position with respect to the support arrangement,
   wherein the second connection means are adjustably connected to the support arrangement, so that a distance between the first connection means and the second connection means is adjustable to counteract a deformation of the wind turbine tower due to gravity,
   wherein the support arrangement comprises a third connection means to detachably fix a position of the second connection means with respect to the support arrangement to support a counteracted shape of the wind turbine tower.

2. The support arrangement according to claim 1, further comprising a linear actuator to adjust the position of the second connection means with respect to the support arrangement.

3. The support arrangement according to claim 2, wherein the linear actuator is a hydraulic cylinder.

4. The support arrangement according to claim 1, further comprising a frame to connect the first and the second connection means, wherein the frame comprises at least two vertical and two horizontal beams.

5. The support arrangement according to claim 1, wherein the first connection means and the second connection means each comprise a pad that is attachable to a flange of the wind turbine tower.

6. The support arrangement according to claim 5, wherein the pad is attached to the support arrangement by a pin.

7. The support arrangement according to claim 1, wherein the second connection means comprises an adjustable locking pin system to connect to the support arrangement, further wherein the locking pin system interacts with a through-hole in the support arrangement.

8. The support arrangement according to claim 7, wherein a second linear actuator is attachable to the locking pin system to adjust a position of the locking pin system with respect to the through-hole in the support arrangement.

9. The support arrangement according to claim 1, wherein the first connection means comprises an adjustable locking pin system to connect to the support arrangement, further wherein the locking pin system interacts with a through-hole in the support arrangement.

10. The support arrangement according to claim 1, wherein the first connection means and the second connection means comprise adapter plates as brackets to support the connection of the pads to the support arrangement.

11. The support arrangement according claim 10, wherein the adapter plate at the second connection means comprise adjustment screws, so that a position of the adapter plate is adjustable with respect to the support arrangement by the use of the adjustment screws.

12. The support arrangement) according to claim 1, further comprising a connection means to connect a crane or a load restraint assembly for handling, storage or transportation.

13. A method to support a tower of a wind turbine using a support arrangement, the support arrangement including a first connection means to connect to a first part of the tower a second connection means to connect to a second part of the tower, wherein the first connection means are fixed in position with respect to the support arrangement, wherein the second connection means are adjustably connected to the support arrangement, so that a distance between the first connection means and the second connection means is adjustable to counteract deformation of the tower due to gravity, and wherein the support arrangement comprises a third connection means to detachably fix a position of the second connection means with respect to the support arrangement to support a counteracted shape of the tower, the method comprising the steps of:
   connecting the first connection means to the tower;
   connecting the second connection means to the tower;
   adjusting the position of the second connection means with respect to the support arrangement; and
   fixing the position of the second connection means with respect to the support arrangement.

14. The method according to claim 13, further comprising the step of:
   attaching a linear actuator to the second connection means;
   using the linear actuator to adjust the position of the second connection means with respect to the support arrangement;
   fixing the position of the second connection means with respect to the support arrangement; and
   detaching the linear actuator.

15. The method according to claim 14, whereby the second connection means comprise a locking pin system, the method further comprising the step of:
   attaching a second linear actuator at the locking pin system;
   adjusting the position of the locking pin system with the second linear actuator; and
   fixing the position of the second connection means with respect to the support arrangement.

16. A support arrangement for a wind turbine tower, comprising:
   a first connection means to connect to a first part of the wind turbine tower; and
   a second connection means to connect to a second part of the wind turbine tower;
   wherein the first connection means are fixed in position with respect to the support arrangement,
   wherein the second connection means are adjustably connected to the support arrangement, so that a distance between the first connection means and the second connection means is adjustable to counteract a deformation of the wind turbine tower due to gravity,
   wherein the support arrangement comprises a third connection means to detachably fix a position of the second connection means with respect to the support arrangement to support a counteracted shape of the wind turbine tower;
   wherein the second connection means comprises an adjustable locking pin system to connect to the support arrangement, further wherein the locking pin system interacts with a through-hole in the support arrangement.

17. A support arrangement for a wind turbine tower, comprising:
- a first connection means to connect to a first part of the wind turbine tower; and
- a second connection means to connect to a second part of the wind turbine tower;
- wherein the first connection means are fixed in position with respect to the support arrangement,
- wherein the second connection means are adjustably connected to the support arrangement, so that a distance between the first connection means and the second connection means is adjustable to counteract a deformation of the wind turbine tower due to gravity,
- wherein the support arrangement comprises a third connection means to detachably fix a position of the second connection means with respect to the support arrangement to support a counteracted shape of the wind turbine tower;
- wherein the first connection means and the second connection means each comprise adapter plates as brackets to support the connection of the pads to the support arrangement.

18. A support arrangement for a wind turbine tower, comprising:
- a first connection component connected to a first part of the wind turbine tower; and
- a second connection component connected to a second part of the wind turbine tower;
- wherein the first connection component is fixed in position with respect to the support arrangement,
- wherein the second connection component is adjustably connected to the support arrangement, so that a distance between the first connection component and the second connection component is adjustable to counteract a deformation of the wind turbine tower due to gravity,
- wherein the support arrangement comprises a third connection component to detachably fix a position of the second connection component with respect to the support arrangement to support a counteracted shape of the wind turbine tower.

* * * * *